United States Patent
Waterhouse

(10) Patent No.: US 9,338,624 B2
(45) Date of Patent: May 10, 2016

(54) CELLULAR TELEPHONE AND COMPUTER PROGRAM COMPRISING MEANS FOR GENERATING AND SENDING AN ALARM MESSAGE

(71) Applicant: Valérie Waterhouse, Strasbourg (FR)

(72) Inventor: Valérie Waterhouse, Strasbourg (FR)

(*) Notice: Subject to any disclaimer, the term of this patent is extended or adjusted under 35 U.S.C. 154(b) by 0 days.

(21) Appl. No.: 14/295,868

(22) Filed: Jun. 4, 2014

(65) Prior Publication Data

US 2014/0349603 A1 Nov. 27, 2014

Related U.S. Application Data

(63) Continuation-in-part of application No. PCT/FR2012/052753, filed on Nov. 29, 2012.

(30) Foreign Application Priority Data

Dec. 5, 2011 (FR) ...................................... 11 03711

(51) Int. Cl.
*H04M 1/725* (2006.01)
*H04W 4/22* (2009.01)

(52) U.S. Cl.
CPC ............ *H04W 4/22* (2013.01); *H04M 1/72536* (2013.01); *H04M 1/72538* (2013.01); *H04M 1/72541* (2013.01)

(58) Field of Classification Search
CPC ...................... H04M 1/72536; H04M 1/72538; H04M 1/72541; H04W 4/22
USPC ..................... 455/567, 566, 404.1
See application file for complete search history.

(56) References Cited

U.S. PATENT DOCUMENTS

| | | | |
|---|---|---|---|
| 7,907,931 B2 | 3/2011 | Hartigan et al. | |
| 2002/0183037 A1 | 12/2002 | Griffin, Jr. et al. | |
| 2005/0221866 A1* | 10/2005 | Huang et al. | 455/567 |
| 2008/0030350 A1 | 2/2008 | Brenner | |
| 2009/0093229 A1 | 4/2009 | Grunow et al. | |
| 2009/0243845 A1* | 10/2009 | Kagawa | G08B 7/066 340/540 |
| 2009/0247167 A1* | 10/2009 | Higashide | H04W 28/08 455/436 |
| 2010/0248788 A1* | 9/2010 | Yook | G06F 3/0481 455/566 |
| 2010/0304722 A1* | 12/2010 | Tanaka | H04M 1/0272 455/414.1 |
| 2011/0021173 A1* | 1/2011 | Randhawa | H04W 4/22 455/404.1 |
| 2012/0329529 A1* | 12/2012 | van Der Raadt | 455/566 |

FOREIGN PATENT DOCUMENTS

| DE | 102007024177 | 12/2008 |
|---|---|---|
| EP | 2 219 163 | 8/2010 |

* cited by examiner

*Primary Examiner* — Qun Shen
(74) *Attorney, Agent, or Firm* — Harness, Dickey & Pierce, P.L.C.

(57) ABSTRACT

The present disclosure relates to a cellular telephone comprising a processor generating and sending an alarm message destined for at least one predefined recipient, in response to an action for the automatic generation of an alert message by a portable telephone to one or more predetermined recipients, the process or being activated by a unique action by the user, and a computer program for detecting as a background task a change of state of at least one man-machine interface of the telephone corresponding to the unique activation action, the change of state being specific to a panic situation associated with pre-recorded parameters, and in case of detection of the change of state, the dispatching of a message for interruption of the processor and for calling of a routine triggering an application ordering the sending of a message containing pre-recorded parameters.

18 Claims, 1 Drawing Sheet

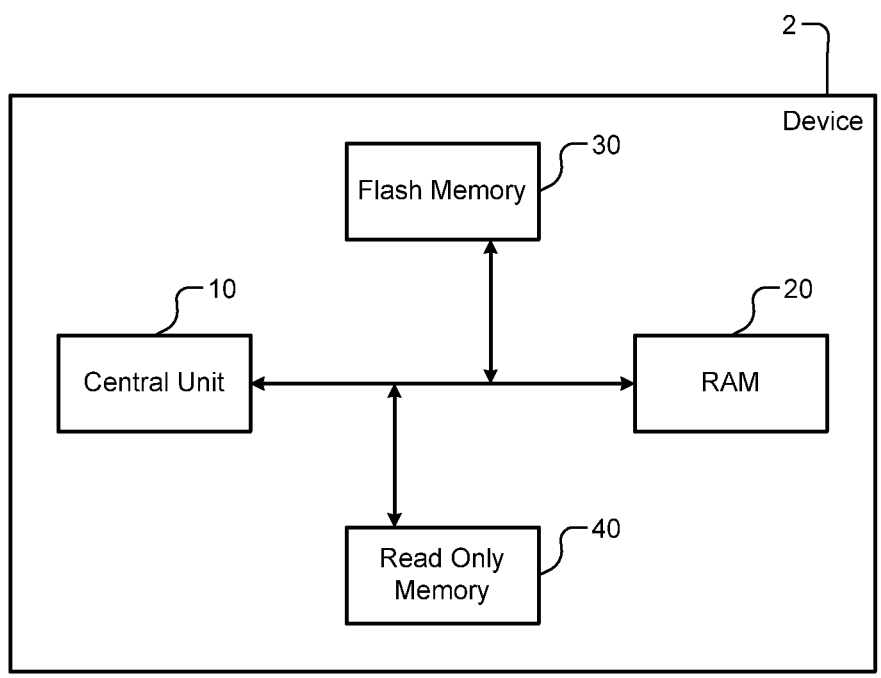

CELLULAR TELEPHONE AND COMPUTER PROGRAM COMPRISING MEANS FOR GENERATING AND SENDING AN ALARM MESSAGE

CROSS-REFERENCE TO RELATED APPLICATIONS

This application is a continuation-in-part of International Application No. PCT/FR2012/052753, filed on Nov. 29, 2012, which claims priority to French Patent Application Ser. No. 1103711, filed on Dec. 5, 2011, both of which are incorporated by reference herein.

FIELD OF THE INVENTION

The present invention relates to the field of personal safety by adapting a "panic" function on a cellular telephone.

BACKGROUND

Various solutions are known in the state of the art, which provide the user of a cellular telephone a means for triggering an alarm message in a so-called panic situation. The NOKIA company has provided a first solution provided on its website "How to use your telephone as a panic button" at the following address: http://www.developer.nokia.com/Community/Wiki/How_to_use_your_telephone_as_a_panic_button.
This solution consists in enabling, in case of a given alert, to dial a telephone number and to send a SMS (short message) to the contacts saved.

The American patent application U.S. 2008/0030350 also provides for a cellular telephone equipped with a specific panic button for activating a broadcast and/or sound message. Another American patent application U.S. 2002/0183037 provides another solution as a dedicated button for activating an alarm message to deter aggressors.

The European Patent EP1629449 describes a portable communication device intended to be held by an individual and used in conjunction with a Bluetooth-enabled cellular telephone. It is used to communicate a signal indicating the existence of an emergency to a base station and comprises a pendant-shaped housing, wherein a first interface circuit is arranged, which comprises a pair of activation switches triggered by alarm buttons in order to facilitate the input of a signal in the device indicating the existence of an emergency. A microprocessor reads the signals in the first interface circuit and reads the last determined position of the device using a GPS positioning circuit in the housing. It also reads the identity of the device, the telephone number of the base station whereto the message relative to the existence of an emergency situation from a programmable memory must be communicated. The microprocessor prepares an activation signal which comprises the identity and the position of the device, the telephone number of the base station and the message which is sent with a time tag to the portable telephone via a Bluetooth sender/receiver. The activation signal activates the portable telephone so as to transfer the data contained in the activation signal to the base station.

The solutions of the prior art are not entirely satisfactory. The solutions based on the addition of a dedicated alarm button are limited to telephones initially designed to implement this feature, and do not make it possible to upgrade a fleet of existing telephones, nor enable a user to upgrade his/her telephone to incorporate this feature. As for the solutions of the prior art providing for the triggering of an alarm from an application installed on the telephone, the drawback is that the activation of an alert requires more actions by the user. To send the alarm, the following is required:
1) Unlock the screen if it is locked or if the user is using another application, click on the Home button to return to the home screen of the telephone;
2) Find the application icon on the telephone home screen and click thereon to open the application;
3) On the home screen of the application, click on "call" or an alert icon and confirm sending the SMS.

This sequence of actions is not adapted to implementation in panic situations, e.g. an assault, an accident or an illness. Besides, some emergency call applications can be operated under certain circumstances only, for instance, when the telephone is locked, or unlocked, or in standby mode.

SUMMARY

The object of the present invention is to overcome these drawbacks by providing a solution enabling the activation of the alert by a unique intervention adapted to a panic situation, which can be installed on any cellular telephone, without any hardware changes and preventing unexpected activations. To this end, the invention, in its broadest sense, relates to a cellular telephone comprising means for generating and sending an alarm or alert message to at least one predefined recipient, in response to an action for the automatic generation of a voice or digital alert message and/or via a SMS and/or an electronic message by a portable telephone, possibly with GPS localization, to one or more predetermined recipient(s), with said means being activated by a unique action by the user. This cellular telephone comprises a computer program for detecting as a background task a change of state of at least one means of man machine interface of the telephone corresponding to said unique activation action, said change of state being specific to a panic situation associated with pre-recorded parameters and in case of detection of said change of state, the sending of a message for calling of a routine triggering an application ordering the sending of a message containing pre-recorded parameters, the program is loaded into the RAM memory of the telephone to be executed without having to display the unlocking screen or the home screen.

"Unique action" means an action consisting in acting once or several times on the same zone, for example en electromechanical key such as the "on/off" key, the volume key, or a touch key, or a touch surface, a shaking detected by the accelerometer. The unique action corresponds to a gesture, or repeated gestures, made by the user, possibly instinctively, without having to look at the telephone. According to a particular embodiment, the method further comprises a step of sending a message for interrupting the processor if said change of state is detected. Preferably, said change of state corresponds to an action on at least one main key of the telephone.

According to a first alternative embodiment, said change of state corresponds to a repeated action on a main key of the telephone, with the number of repetitions being greater than or equal to 3. The first action on a main key, for example the On/Off key, keeps its main function, i.e. displaying the unlocking screen if the phone was in standby mode or turning it off if the telephone was not in standby mode; the second action keeps its main function, i.e. displaying the home locking screen if the first action has turned it off, or turning it off if the first action has displayed it. The sequence of the first two actions and the following ones triggers the alert.

According to a second alternative embodiment, said change of state corresponds to a long action on a main key of the telephone, with the duration of such long action being longer than or equal to three seconds. According to a third alternative embodiment, said change of state corresponds to an action detected by the gyroscopic sensor of the telephone corresponding to a shaking for a time and of amplitude above predetermined threshold values. According to a fourth alternative embodiment, said change of state corresponds to the speech recognition of onomatopoeia or of a predefined sequence of words.

According to a preferred embodiment, the change of state activates the telephone buzzer, and this is also true when the telephone settings correspond to a deactivation of the buzzer, in order to inform the user of the correct execution of the alert. The invention also relates to a computer program adapted to be stored in the memory of a cellular telephone. Said program is so configured as to detect as a background task a change of state of at least one means of man machine interface of the telephone corresponding to said unique activation action, with said change of state being specific to a panic situation associated with pre-recorded parameters, and in case of detection of said change of state, the sending of an message for calling of a routine triggering an application ordering the sending of a message containing pre-recorded parameters. Advantageously, said change of state corresponds to an action on at least one of the main key of the telephone.

According to a first alternative embodiment, said change of state corresponds to a repeated action on a main key of the telephone, with the number of repetitions being greater than or equal to three. According to a second alternative embodiment, said change of state corresponds to a long action on a main key of the telephone, with the duration of said action being longer than or equal to three seconds. According to a third alternative embodiment, said change of state corresponds to an action detected by the gyroscopic sensor of the telephone corresponding to the shaking for a time and of amplitude above predetermined threshold values. In a fourth embodiment, said change of state corresponds to the speech recognition of a predefined sentence or onomatopoeia.

The technical effect of this invention is to enable to trigger the alarm without having
 (i) to display the home screen of the cellular telephone to click on an icon (the application icon or when extrapolating the solutions of the prior art, the "panic button" icon)
 (ii) nor to re-open the application but
 (iii) at all times and under all circumstances thus:
 even though the screen is locked,
 even though the user is using another application,
 even though the application is closed
 whether the telephone is in standby mode or not, whether the telephone is locked or not.

BRIEF DESCRIPTION OF THE DRAWING

The invention will be better understood when reading the following description of a not restrictive exemplary embodiment illustrated by the appended drawings wherein:
FIG. 1 shows a schematic view of the architecture implemented by the invention.

DETAILED DESCRIPTION

John, the user, owns a device 1, for instance a cellular telephone. The general architecture of such device includes:
 a central unit 10 associated with a number of memories, among which:
 a Random Access Memory (RAM) 20 used as intermediary storage during communications and the interaction of the user with the telephone. It may be implemented either as a fully integrated circuit on the mother board, or as a component, positioned with the CPU 10 within the same integrated circuit;
 a flash memory 30 with capacities above Mega octets. It makes it possible to permanently store such elements as: the phone book, the missed and received calls, the call records, the organiser, the received and sent text and multimedia messages, the multimedia files;
 a Read Only Memory (ROM and OTP) 40 for storing the telephone operating system and services dedicated to security.

To trigger the alert, the solution according to the invention does not use a series of actions by the user (which is often impossible in a situation of danger) but a "panic" button on the cellular telephone and possibly the voice recognition or an action detected by the gyroscopic sensor. The application controlling this alert functionality is executed by the telephone operating system. If the operating system is Android, the application implements the "intent" function starting an action in case a physical event is detected, for instance the activation of a key. This Intent function makes it possible to send and to receive messages (possibly including data) to trigger an action, to/in a component of the same application (example: an Activity) as well as of another application, in the invention the communication application.

The triple action on the main key (for instance the so-called "Home" key on a cellular telephone such as the IPhone (registered trademark) for accessibility, is an exemplary implementation of the invention. This triple action works under any circumstance and in particular even though the screen is locked or though the user is using another application. It would work even though the application of the invention were closed since the triggering thereof would, independently of whether the application is open or not, generate an automatic call and possibly the automatic sending of a SMS and/or an email with GPS location. Other solutions are possible: a quadruple action on the main button, a long action, an action on another button of the cellular telephone, or on a combination of buttons, a shaking of the telephone and signal analysis provided by the built-in gyroscopic sensor in the telephone and/or using the voice recognition means.

According to the invention, the call is automatically triggered, without any additional action by the user, who will not have to talk. In the applications of the prior art, the user has to confirm the call so that it can be made, which is a further step in the triggering of the alert often impossible in a situation of danger. In competing applications, the user has to speak during the call, which is often not possible in a situation of danger. According to the invention, the call will optionally comprise a pre-recorded message and the user will not need to talk. The purpose of the call is not to talk but to inform the person to be contacted of the triggering of the alarm, and possibly to enable this person to hear what is going on. Eventually, the call may be digital to remedy the absence of network.

The sending of the SMS message will also be automatic, whereas it must be confirmed in the applications of the prior art. Again, a step of triggering the alert is eliminated with the invention and, in case of "danger", it is very likely that the user won't have time or be in the physical condition suitable to perform all the steps required by competing applications. The voice or digital message may comprise information relative to the identity of the cellular telephone subscriber (e.g. his/her name, his/her digital subscriber ID or that of his/her telephone or his/her SIM card) and its location (GPS coordinates and/or designation of the cell wherein the message has been sent) contained in the pre-recorded parameters.

The invention is not limited to a given message type, nor to a specific activation mode. Activating the alert procedure is possible by clicking twice or several times on one or more key(s), for example through a simple combination of short and long sequences. The used button is advantageously a main key or optionally another button but in all cases, an existing button on the telephone. It may, in particular, be the "on/off" key. Besides, the message can be sent periodically, for example every 5 minutes or according to another adjustable frequency. It is then possible for the user to interrupt the alert procedure by example by entering a personal code.

The application is installed in a part of the telephone memory 40 so as to remain available at all times, including when the main applications are in standby mode, or when the telephone is locked. However the application may be:
  intentionally deactivated by one setting of the telephone functionalities,
  deactivated by a locking code in the application settings: the settings can be modified only after entering the code; entering the code will also be necessary to stop an alert;
  the application also controls the saving and the reading of one or more contacts which the messages are automatically sent to, if the alert is triggered. Such contacts are saved in a dedicated portion of the memory 30 or in the portion containing the phone book.

Alert messages may be SMS messages, or an email customized when setting the application. The application is preferably so configured as to control the triggering of the alert, whether the telephone is in standby mode or not, whether the telephone is locked or not.

Geo-localization operates, whether the GPS is enabled or not on the telephone, but it is more precise when the GPS is activated. However, if the GPS is activated in the telephone settings, it is not used by the application, except in case of an alert—which avoids using the battery other than in case of an alert.

Optionally, the application also controls a vibration upon each repeated action (a short vibration), and for confirming that the alert has been triggered (a long vibration such as "SOS" in Morse code) so that the user can be informed of the triggering of the alert without having to look at the screen. The telephone remains active in case of an alert. It may order the repeated sending of alert messages, for instance every 2 minutes until the alert is stopped, which makes it possible (i) to reinforce the probability that the contact will see the alert messages and (ii) to follow the movements. Optionally, a complementary application is executed on the telephone of the message recipient, if the latter has installed the application on his/her telephone.

When receiving an alert message, the application controls three functionalities:
  a GPS tracking of the emitter's movements;
  the emergency call will ring the contact's phone, even though it may be in silent or vibrating mode. The contact may however choose a setting so that his/her telephone will not ring or will not vibrate in case of an alert.
  the contact may choose, in a setting, who are the persons authorized (or everybody, or nobody) to send him/her alert messages.

In an alternative solution, the alarm is triggered by a triple action on the "Home" key on the telephone, and then by clicking on an icon. According to an alternative solution, the action triggering the alarm is applied to a connected object linked by a Bluetooth connection. The call may last only 15 seconds (to draw the contact's attention), or last until the selected contact picks up the phone (then with the possibility, but not the necessity of talking) or the call may be transferred to the message service.

A special solution for implementing the invention consists in executing an application on a phone using the ANDROID (registered trademark) operating system. The alert is activated by pressing the on/off button several times, which usually causes the turning off or the turning on of the screen. The loaded application detects such events using the intent system, called Android "Intents" (registered trademark). The advantage of this solution is that an action can be triggered without the telephone being unlocked or the application being in the foreground.

The invention claimed is:

1. A cellular telephone comprising a processor generating and sending an alarm message destined for at least one predefined recipient, in response to an action for automatic generation of the alarm message by the cellular telephone to the at least one predefined recipient, the processor being activated by a unique activation action by a user, the cellular telephone further comprising a computer program for detecting as a background task a change of state of a single pre-existing key of the cellular telephone corresponding to the unique activation action, wherein the single pre-existing key includes a power on/off key, a volume key, or a home key of the cellular telephone and excludes a special key to detect the unique activation action, with the change of state being specific to a panic situation associated with pre-recorded parameters and in case of detection of the change of state, and sending a message for calling a routine triggering an application ordering sending of the alarm message in vocal or digital form containing the pre-recorded parameters, wherein the processor is configured to detect the unique activation action without having to display a home screen and without requiring activation of an application displayed on the home screen, and regardless of whether a screen of the cellular telephone is locked, a user of the cellular telephone is using an application, and the cellular telephone is locked or in standby mode.

2. The cellular telephone according to claim 1, wherein the change of state corresponds to an action on the single pre-existing key of the cellular telephone.

3. The cellular telephone according to claim 2, wherein the action on the single pre-existing key of the cellular telephone is a repeated action, with the number of repetitions being greater than or equal to 3.

4. The cellular telephone according to claim 2, wherein the action on the single pre-existing key of the cellular telephone is a long action, with the duration of the action being longer than or equal to three seconds.

5. The cellular telephone according to claim 1, wherein the change of state corresponds to an action detected by the gyroscopic sensor of the cellular telephone corresponding to a shaking for a time and of amplitude above predetermined threshold values.

6. The cellular telephone according to claim 1, wherein the change of state corresponds to speech recognition of onomatopoeia or of a predefined sequence of words.

7. A non-transitory computer-readable medium comprising a computer program comprising instructions executed by a processor to detect as a background task a change of state of a single pre-existing key of a cellular telephone corresponding to a unique activation action, wherein the single pre-existing key includes a power on/off key, a volume key, or a home key of the cellular telephone and excludes a special key to detect the unique activation action, with the change of state being specific to a panic situation associated with pre-recorded parameters, and in case of detection of the change of state, calling a routine triggering an application ordering sending of a voice or digital alert message containing the pre-recorded parameters, wherein the processor is configured to detect the unique activation action without having to display a home screen and without requiring activation of an application displayed on the home screen, and regardless of whether a screen of the cellular telephone is locked, a user of the cellular telephone is using an application, and the cellular telephone is locked or in standby mode.

8. The non-transitory computer-readable medium according to claim 7, wherein the change of state corresponds to an action on the single pre-existing key of the cellular telephone.

9. The non-transitory computer-readable medium according to claim 8, wherein the action on the single pre-existing key of the cellular telephone is a repeated action, with number of repetitions being greater than or equal to three.

10. The non-transitory computer-readable medium according to claim 8, wherein the action on the single pre-existing key of the cellular telephone is a long action, with duration of the action being longer than or equal to three seconds.

11. The non-transitory computer-readable medium according to claim 7, wherein the change of state corresponds to an action detected by a gyroscopic sensor of the cellular telephone corresponding to a shaking for a time and of amplitude above predetermined threshold values.

12. The non-transitory computer-readable medium according to claim 7, wherein the change of state corresponds to speech recognition of onomatopoeia or of a predefined sequence of words.

13. A cellular telephone comprising:
a processor configured to detect a predefined action performed on a single pre-existing key of the cellular telephone,
wherein the single pre-existing key includes a power on/off key, a volume key, or a home key of the cellular telephone, and excludes a special key to detect the predefined action;
wherein the detection of the predefined action performed on the single pre-existing key:
triggers an indication of an emergency event on the cellular telephone, and
causes transmission of a communication from the cellular telephone to a specified remote device to indicate the emergency event to the specified remote device; and
wherein the processor is configured to detect the predefined action without having to display a home screen and without requiring activation of an application displayed on the home screen, and regardless of whether a screen of the cellular telephone is locked, a user of the cellular telephone is using an application, and the cellular telephone is locked or in standby mode.

14. The cellular telephone of claim 13, wherein the cellular telephone does not include a special key in addition to standard pre-existing keys of the cellular telephone to perform the predefined action for triggering the indication of the emergency event on the cellular telephone and causing the transmission of the communication indicating the emergency event from the cellular telephone to a specified remote device.

15. The cellular telephone of claim 13, wherein the predefined action includes repeatedly pressing the single pre-existing key more than three times, or pressing and holding the single pre-existing key for more than three seconds.

16. The cellular telephone of claim 13, wherein the indication of the emergency event on the cellular telephone includes an audio or video indication on the cellular telephone or vibration of the cellular telephone.

17. The cellular telephone of claim 13, wherein the transmission of a communication indicating the emergency event includes transmission of a predefined audio or text message or an email.

18. The cellular telephone of claim 13, wherein the transmission of a communication indicating the emergency event includes transmission of identifying information of the cellular telephone or of a user of the cellular telephone, or location of the cellular telephone via an audio or text message or an email.

* * * * *